United States Patent
Tsuruta et al.

(10) Patent No.: US 10,913,411 B2
(45) Date of Patent: Feb. 9, 2021

(54) POWER RELAY DEVICE (71) Applicants: SUMITOMO WIRING SYSTEMS, LTD., Mie-ken (JP); HONDA MOTOR CO., LTD., Tokyo (JP)

(72) Inventors: Takashi Tsuruta, Yokkaichi (JP); Kentaro Wakebe, Saitama (JP)

(73) Assignees: SUMITOMO WIRING SYSTEMS, LTD., Mie-ken (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/443,067

(22) Filed: Jun. 17, 2019

(65) Prior Publication Data
US 2019/0389408 A1 Dec. 26, 2019

(30) Foreign Application Priority Data
Jun. 26, 2018 (JP) .................... 2018-121205

(51) Int. Cl.
B60R 1/00 (2006.01)
B60R 16/023 (2006.01)
F02N 11/08 (2006.01)
B60R 16/033 (2006.01)

(52) U.S. Cl.
CPC ........ *B60R 16/033* (2013.01); *B60R 16/0238* (2013.01); *F02N 11/0862* (2013.01); *F02N 2011/0874* (2013.01)

(58) Field of Classification Search
CPC B60R 16/033; B60R 16/0238; F02N 11/0862
See application file for complete search history.

(56) References Cited

U.S. PATENT DOCUMENTS

| 6,472,772 | B2* | 10/2002 | Onizuka ............. B60R 16/0238 307/10.1 |
| 6,541,700 | B2* | 4/2003 | Chiriku ............... B60R 16/0238 174/50 |
| 9,281,147 | B2* | 3/2016 | Elberbaum ............ H01H 50/58 |
| 9,947,497 | B2* | 4/2018 | Dulle ....................... B60L 50/64 |
| 10,156,218 | B2* | 12/2018 | Murata ............... F02N 11/0844 |
| 10,366,852 | B2* | 7/2019 | Birner .................... H01H 9/043 |
| 2017/0267194 | A1 | 9/2017 | Aruga et al. |

FOREIGN PATENT DOCUMENTS

| JP | 7-326275 A | 12/1995 |
| JP | 2017-169407 A | 9/2017 |

* cited by examiner

Primary Examiner — Dinh T Le
(74) Attorney, Agent, or Firm — Greenblum & Bernstein, P.L.C.

(57) ABSTRACT

A power relay device is provided that relays power from a power source and supplies the power to an electric component. The power relay device includes a main device body, a terminal cover, and a holding unit. The main device body includes a power source terminal electrically connected to the power source and a load terminal electrically connected to the electric component. The terminal cover includes a connection terminal electrically connectable to a connected subject that is one of the power source terminal and the load terminal. The holding unit selectively sets a temporary holding state in which the connection terminal is electrically disconnected from the connected subject or a final holding state in which the connection terminal is electrically connected to the connected subject.

4 Claims, 13 Drawing Sheets

POWER RELAY DEVICE

BACKGROUND

1. Field

The present disclosure relates to a power relay device.

2. Description of Related Art

In vehicle assembly plants, electric components of vehicles are tested using the power of a battery. There are cases in which the battery cannot be installed in the engine compartment, such as when the battery is mounted on a hybrid vehicle or when the engine is too large to allow the battery to be installed in the engine compartment. In such a case, the battery is installed in a console or the like and cannot be easily removed (for example, refer to Japanese Laid-Open Patent Publication No. 2017-169407).

When the battery is installed in the console or the like, the battery terminals cannot be easily removed. As a result, the battery charge level will decrease if the battery terminals are continuously connected for electric testing and kept connected until the vehicle is sent out of the plant.

SUMMARY

It is an objective of the present disclosure to provide a power relay device that limits reduction in the charge level of a power source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power relay device is provided that relays power from a power source and supplies the power to an electric component. The power relay device includes a main device body, a terminal cover, and a holding unit. The main device body includes a power source terminal electrically connected to the power source and a load terminal electrically connected to the electric component. The terminal cover includes a connection terminal electrically connectable to a connected subject that is one of the power source terminal and the load terminal. The holding unit selectively sets a temporary holding state in which the connection terminal is electrically disconnected from the connected subject or a final holding state in which the connection terminal is electrically connected to the connected subject.

With this structure, even in the temporary holding state in which the connection terminal arranged on the terminal cover is electrically disconnected from the connected subject that is one of the power source terminal and the load terminal arranged on the main device body, power can be temporarily supplied from the power source to the electric component by electrically connecting the connection terminal to the other one of the power source terminal and the load terminal. Thus, power is not constantly supplied from the power source to the electric component, and the charge level of the power source is not decreased.

In the above power relay device, the connection terminal may be a first connection terminal and the connected subject may be a first connected subject. The power relay device may further include a second connection terminal electrically connected to a second connected subject that is the other one of the power source terminal and the load terminal and differs from the first connected subject. The first connection terminal may include a main terminal portion configured to come into planar contact with the first connected subject and an extension portion bent and extended from the main terminal portion. The second connection terminal may include a main terminal portion configured to come into planar contact with the second connected subject and an extension portion bent and extended from the main terminal portion.

With this structure, even in the temporary holding state in which the second connection terminal is electrically connected to the second connected subject and the first connection terminal is electrically disconnected from the first connected subject, an external connection medium is coupled to connect the extension portion of the first connection terminal and the extension portion of the second connection terminal so that power can be supplied from the power source to the electric component. Thus, the electric component can be easily tested.

In the above power relay device, the holding unit may include an engaging portion arranged on one of the main device body and the terminal cover and an engaged portion arranged on the other one of the main device body and the terminal cover. The engaging portion and the engaged portion may cooperate to form a lock that functions to restrict separation of the terminal cover from the main device body in a coupling direction of the terminal cover.

This structure restricts separation of the terminal cover thereby improving the workability.

In the above power relay device, the engaging portion may include an arm extending toward the engaged portion and a hook arranged on a distal end of the arm. The hook engages the engaged portion to function as the lock. The engaged portion may include a movement restriction portion that restricts movement of the arm of the engaging portion from a temporary holding position toward a final holding position. In the temporary holding position, the terminal cover is in the temporary holding state in which the connection terminal is electrically disconnected from the connected subject, and in the final holding position, the terminal cover is in the final holding state in which the connection terminal is electrically connected to the connected subject.

With this structure, movement of the arm arranged on one of the main device body or the terminal cover is restricted by the movement restriction portion arranged on the other one of the main device body or the terminal cover to maintain the temporary holding state. This allows for stable connection when testing the electric component.

In the above power relay device, the engaged portion may include a guide that guides movement of the arm of the engaging portion from the temporary holding position toward the final holding position. The arm may have enough resiliency to move from the temporary holding position toward the final holding position while being elastically deformed when guided by the guide.

This structure facilitates shifting of the terminal cover from the temporary holding state to the final holding state after completing testing of the electric component.

Other features and aspects will be apparent from the following detailed description, the drawings, and the claims.

BRIEF DESCRIPTION OF THE DRAWINGS

FIG. 2 includes two perspective views of the same terminal cover taken from different directions.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of a power relay device will now be described.

Figure 1:
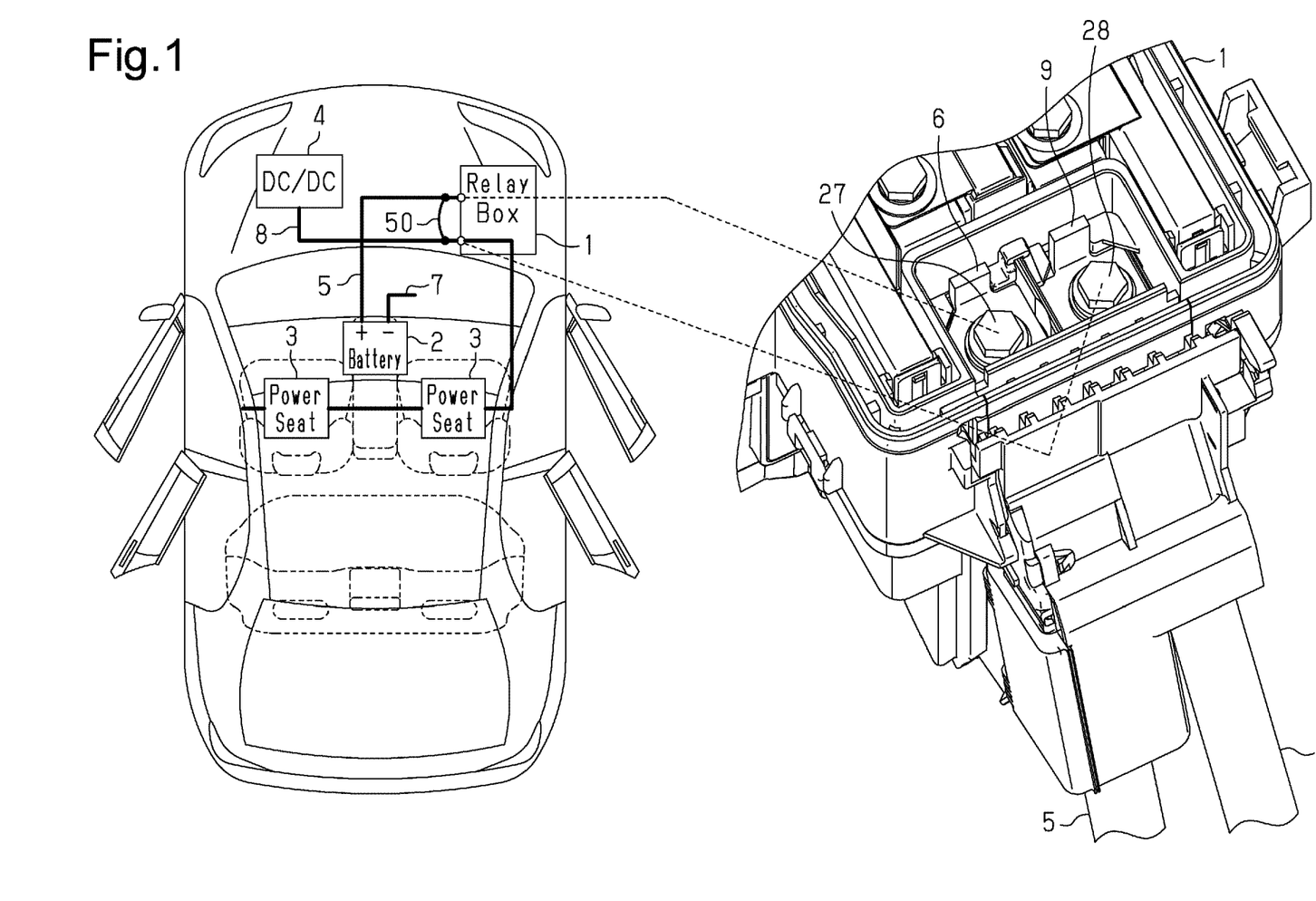
FIG. 1 includes a layout diagram showing the layout of components in an example in which a power relay device including a relay box installed in an engine compartment relays power from a battery installed in a console inside a passenger compartment to power seats and a partial perspective view of the power relay device.

As shown in FIG. 1, a relay box 1, which forms an example of the power relay device, is installed in an engine compartment of a vehicle. The relay box 1 relays power from a battery 2 and supplies the power to power seats 3. The battery 2 is installed in a console or the like inside a passenger compartment of the vehicle. The power seats 3 are examples of electric components. Further, the relay box 1 relays power from a DC/DC converter 4 installed in the engine compartment and supplies the power to the power seats 3. When the vehicle is traveling, the power seats 3 are actuated with power output from the DC/DC converter 4. When the vehicle is being assembled in a vehicle assembly plant, the power seats 3 are tested using the power of the battery 2 during an electric component check. The battery 2 serves as an example of a power source.

One end of a battery cable 5 is electrically connected to the positive electrode of the battery 2. The other end of the battery cable 5 is provided with a connection terminal 6 bolted to one section, namely, a first section, of a terminal base of the relay box 1. One end of a ground cable 7 is electrically connected to the negative electrode of the battery 2. The other end of the ground cable 7 is electrically connected to the vehicle body and grounded. The connection terminal 6 serves as an example of a first connection terminal.

The terminal base of the relay box 1 includes a second section arranged next to the first section. A connection terminal 9 provided on one end of a cable 8, which differs from the battery cable 5, is bolted to the second section of the terminal base of the relay box 1. The other end of the cable 8 is electrically connected to an output terminal of the DC/DC converter 4. The connection terminal 9 serves as an example of a second connection terminal.

Figure 2:
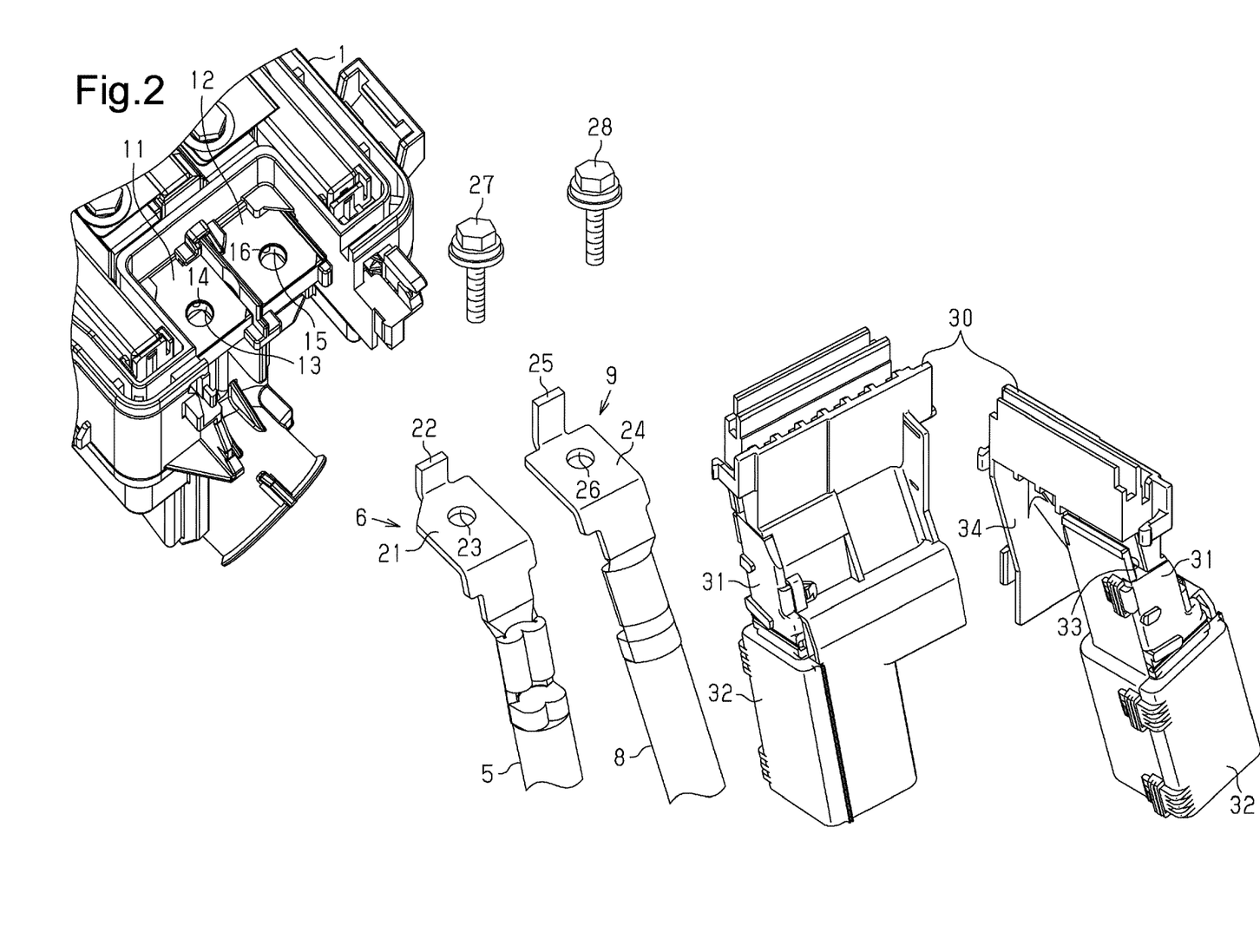
FIG. 2 is an exploded perspective view showing part of the power relay device.

As shown in FIG. 2, the first section of the terminal base of the relay box 1 includes a power source terminal 11 that is electrically connected to the connection terminal 6. The second section of the terminal base of the relay box 1 includes a load terminal 12 that is electrically connected to the connection terminal 9. The power source terminal 11 is part of a first plate that is coupled to the relay box 1. The load terminal 12 is part of a second plate that is coupled to the relay box 1. The plates are separate parts.

The power source terminal 11 has the shape of flat plate and includes a through hole 14 that corresponds to a bolt coupling hole 13 of the terminal base. In the same manner, the load terminal 12 has the shape of flat plate and includes a through hole 16 that corresponds to a bolt coupling hole 15 of the terminal base.

The connection terminal 6 includes a main terminal portion 21 and a clip coupling portion 22. The main terminal portion 21 is configured to come into planar contact with an upper surface of the power source terminal 11. The clip coupling portion 22 is a narrow portion that is bent to extend substantially perpendicularly from a central part of a distal end of the main terminal portion 21. The main terminal portion 21 includes a through hole 23 corresponding to the through hole 14 of the power source terminal 11. In the same manner, the connection terminal 9 includes a main terminal portion 24 and a clip coupling portion 25. The main terminal portion 24 is configured to come into planar contact with an upper surface of the load terminal 12. The clip coupling portion 25 is a narrow portion that is bent to extend substantially perpendicularly from a central part of a distal end of the main terminal portion 24. The main terminal portion 24 includes a through hole 26 corresponding to the through hole 16 of the load terminal 12. The length of the clip coupling portion 22 projecting from the main terminal portion 21 is smaller than the length of the clip coupling portion 25 projecting from the main terminal portion 24. The difference between the projection lengths of the clip coupling portions 22 and 25 coincides with the length of stroke of the connection terminal 6 in the vertical direction when the connection terminal 6 is coupled to the relay box 1.

A bolt 27 is inserted through the through hole 23 and the through hole 14 from an upper side of the main terminal portion 21 parallel to a direction in which the clip coupling portion 22 projects from the main terminal portion 21. The inserted bolt 27 is fastened to the bolt coupling hole 13 so that the connection terminal 6 is held in the first section of the terminal base of the relay box 1 (refer to FIG. 1). In the same manner, a bolt 28 is inserted through the through hole 26 and the through hole 16 from an upper side of the main terminal portion 24 parallel to a direction in which the clip coupling portion 25 projects from the main terminal portion 24. The inserted bolt 28 is fastened to the bolt coupling hole 15 so that the connection terminal 9 is held in the second section of the terminal base of the relay box 1 (refer to FIG. 1).

Figure 3:
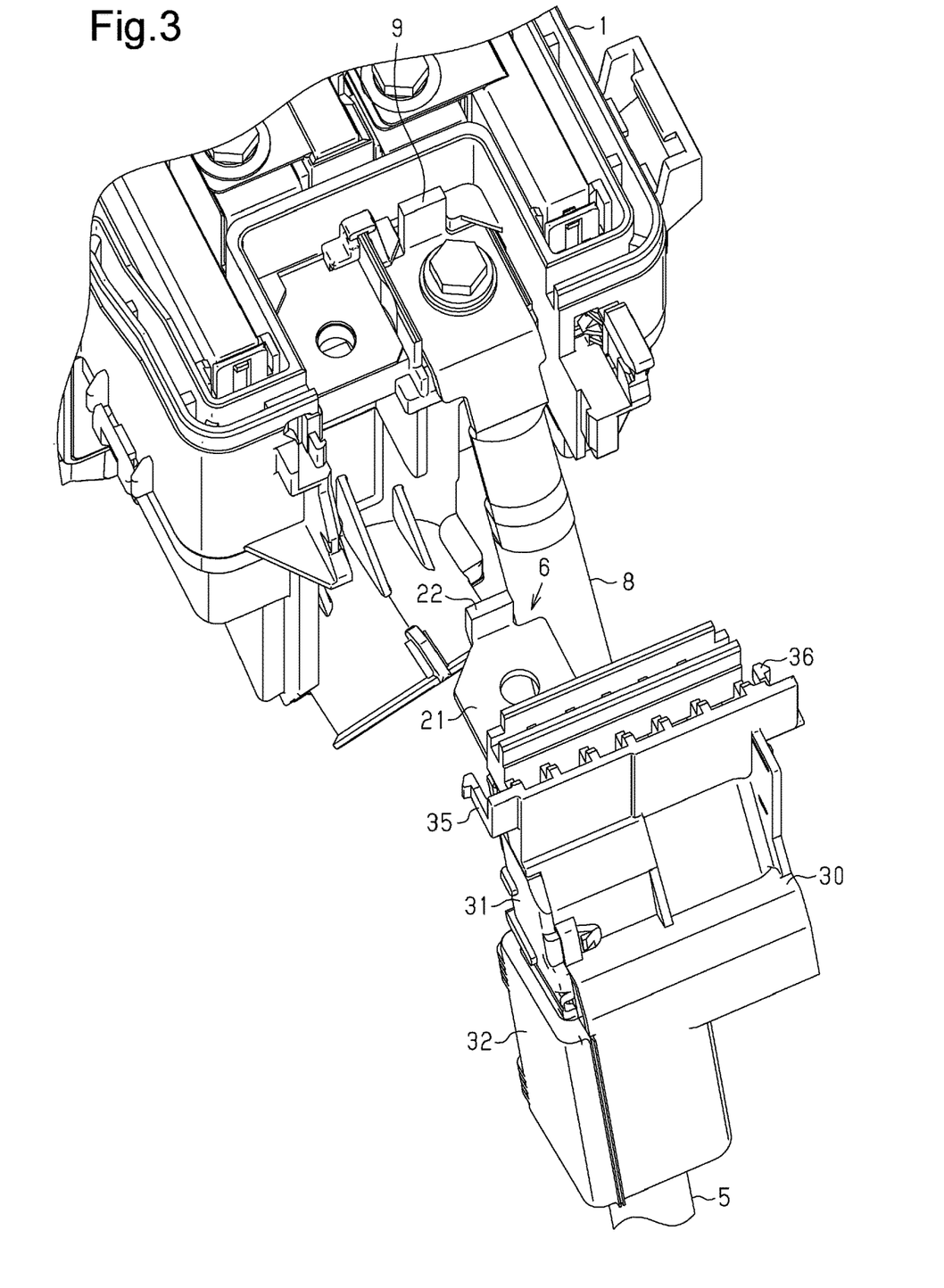
FIG. 3 is a partial perspective view of the power relay device before the terminal cover is coupled to the relay box.

As shown in FIG. 3, the cable 8 including the connection terminal 9 is coupled to the relay box 1 in isolation, whereas the battery cable 5 including the connection terminal 6 is coupled to the relay box 1 in a state coupled to and integrated with a terminal cover 30. The terminal cover 30 includes a first cover 31 and a second cover 32 that cooperate to define an accommodation compartment 33 (refer to FIG. 2). The accommodation compartment 33 accommodates connected portions of the connection terminal 6 and the battery cable 5. The connection terminal 6 is arranged so that the main terminal portion 21 projects out of the accommodation compartment 33 substantially horizontally and the clip coupling portion 22 projects upward from the distal end of the main terminal portion 21 in a state in which a basal end of the connection terminal 6, that is, the portion connecting the connection terminal 6 and the battery cable 5, is located in the accommodation compartment 33. The terminal cover 30 includes a clearance groove 34 arranged near the accommodation compartment 33 to avoid interference with the cable 8 (refer to FIG. 2).

Figure 4:
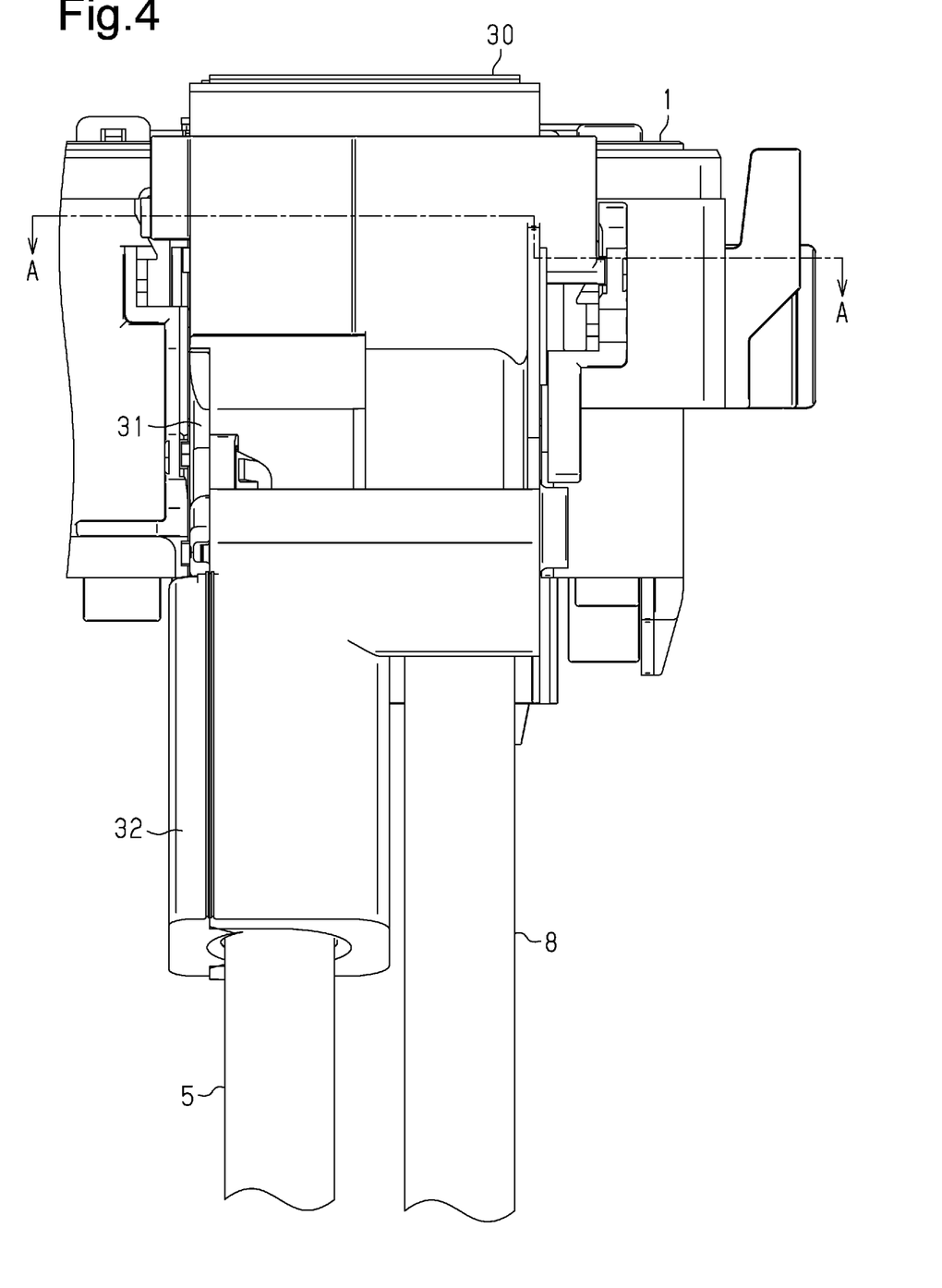
FIG. 4 is a partial front view of the power relay device before the terminal cover is locked.
Figure 5:
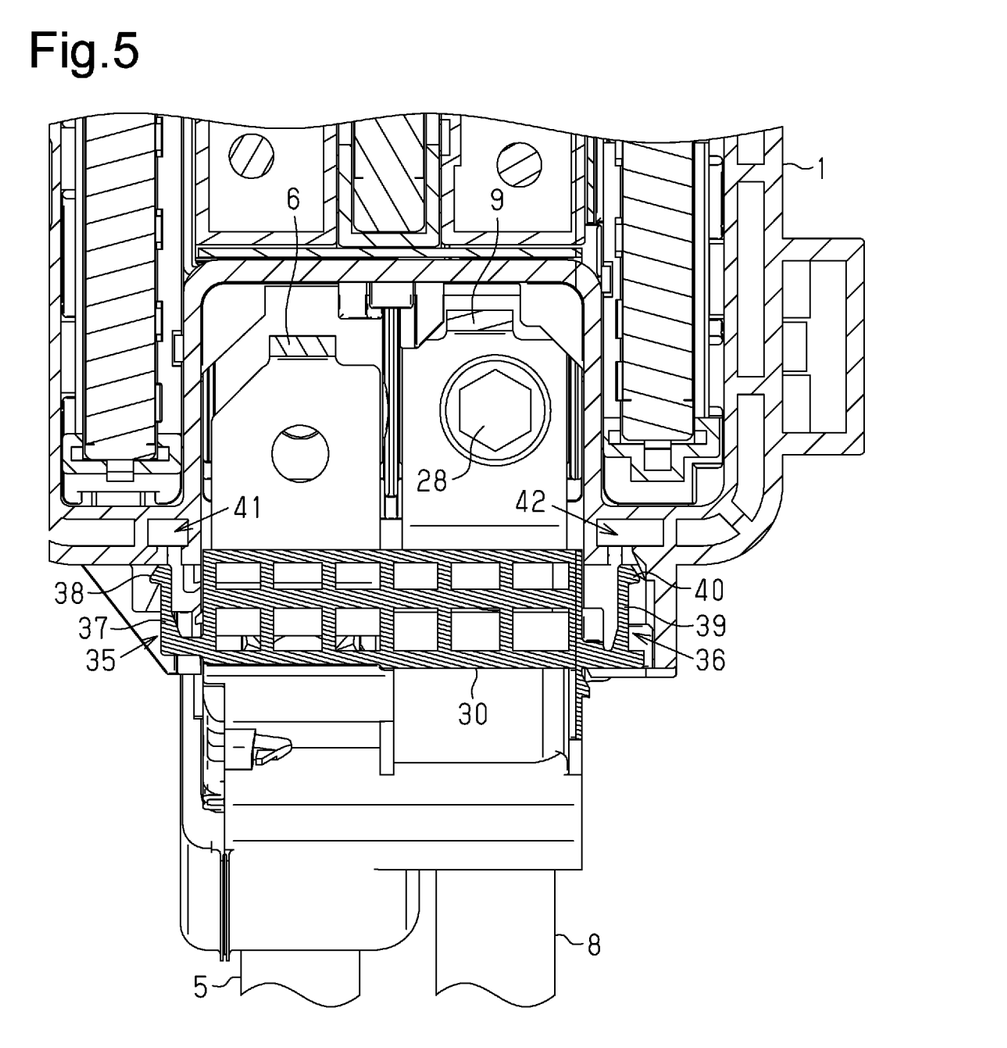
FIG. 5 is a cross-sectional view taken along line A-A in FIG. 4.

Two sides of the terminal cover 30 in the widthwise direction include two elastic engaging portions 35 and 36 that are arranged at slightly different heightwise positions. In one example, the engaging portion 36 arranged at the right side close to the clearance groove 34 is located at a lower position than the engaging portion 35, which is arranged at the left side close to the accommodation compartment 33 (refer to FIGS. 4 and 5). The engaging portion 35 includes an arm 37 and a hook 38. The arm 37 extends horizontally from the terminal cover 30 toward the relay box 1. The hook 38 is arranged on a distal end of the arm 37 projecting outward in the widthwise direction of the terminal cover 30. In the same manner, the engaging portion 36 includes an arm 39 and a hook 40. The arm 39 extends horizontally from the terminal cover 30 toward the relay box 1. The hook 40 is arranged on a distal end of the arm 39 projecting outward in the widthwise direction of the terminal cover 30.

Figure 6:
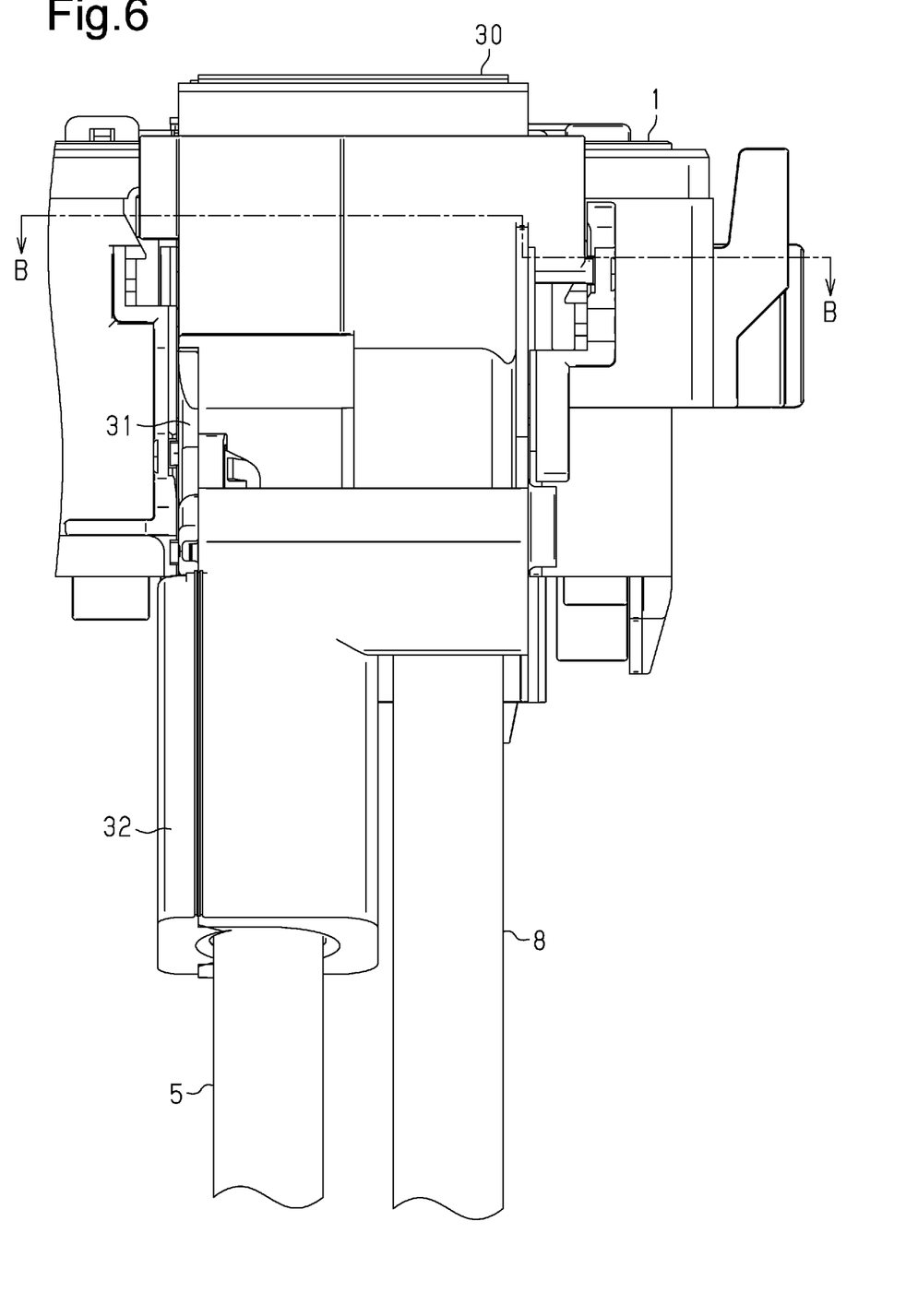
FIG. 6 is a partial front view of the power relay device after the terminal cover is locked.
Figure 7:
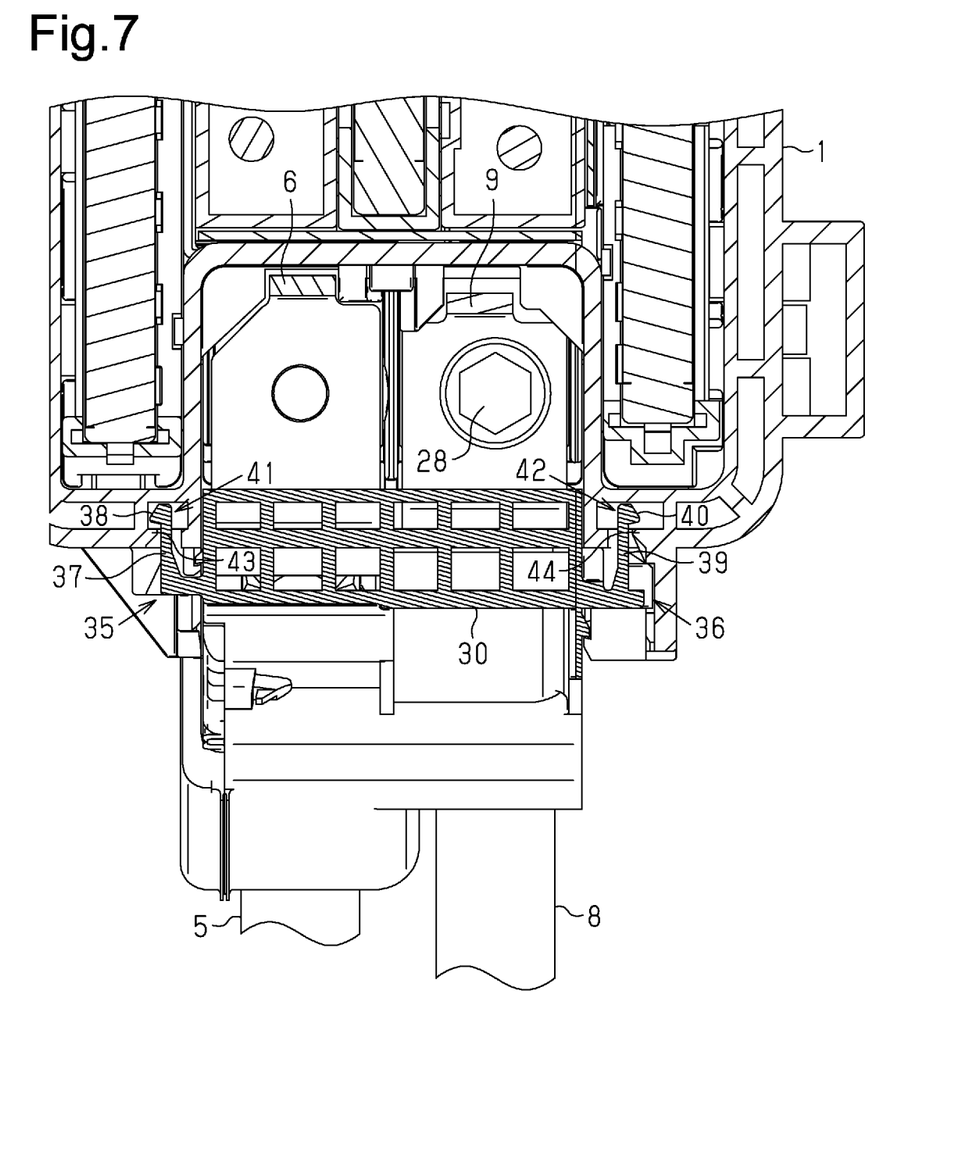
FIG. 7 is a cross-sectional view taken along line B-B in FIG. 6.

The relay box 1 includes an engaged portion 41, which is engaged with the engaging portion 35, and an engaged portion 42, which is engaged with the engaging portion 36. The engaged portion 41 includes a stopper 43 that restricts separation of the hook 38 of the engaging portion 35 from the relay box 1 in a coupling direction of the terminal cover 30 (refer to FIGS. 6 and 7). In the same manner, the engaged portion 42 includes a stopper 44 that restricts separation of the hook 40 of the engaging portion 36 from the relay box 1 in the coupling direction of the terminal cover 30 (refer to FIGS. 6 and 7). The hook 38 and the stopper 43 cooperate to form a first lock, which serves as an example of a lock. The hook 40 and the stopper 44 cooperate to form a second lock, which serves as an example of the lock. In the present embodiment, the two locks restrict separation of the terminal cover 30 from the relay box 1 in the coupling direction of the terminal cover 30.

Figure 8:
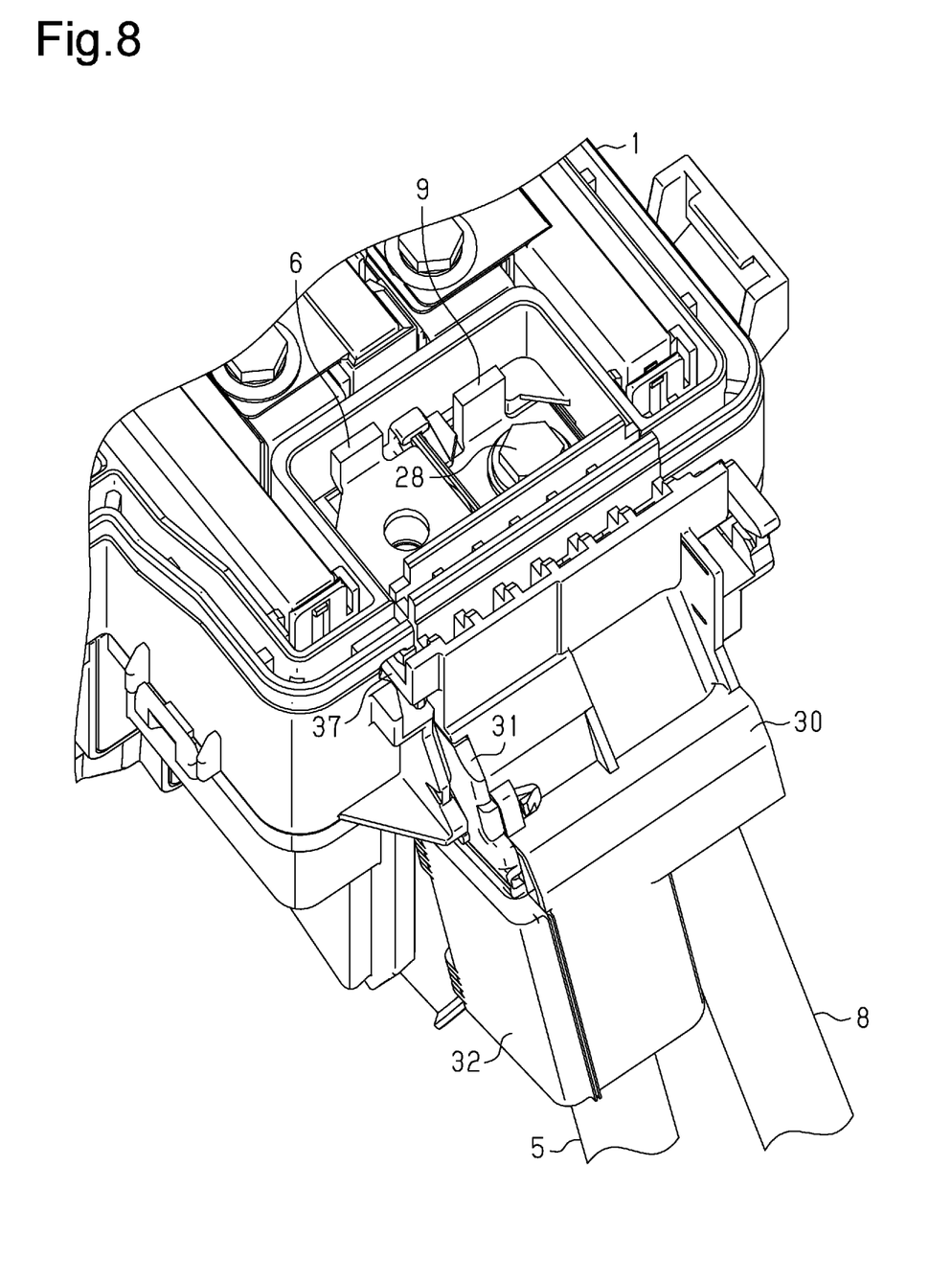
FIG. 8 is a partial perspective view of the power relay device in a state in which the terminal cover is temporarily held by the relay box.
Figure 9:
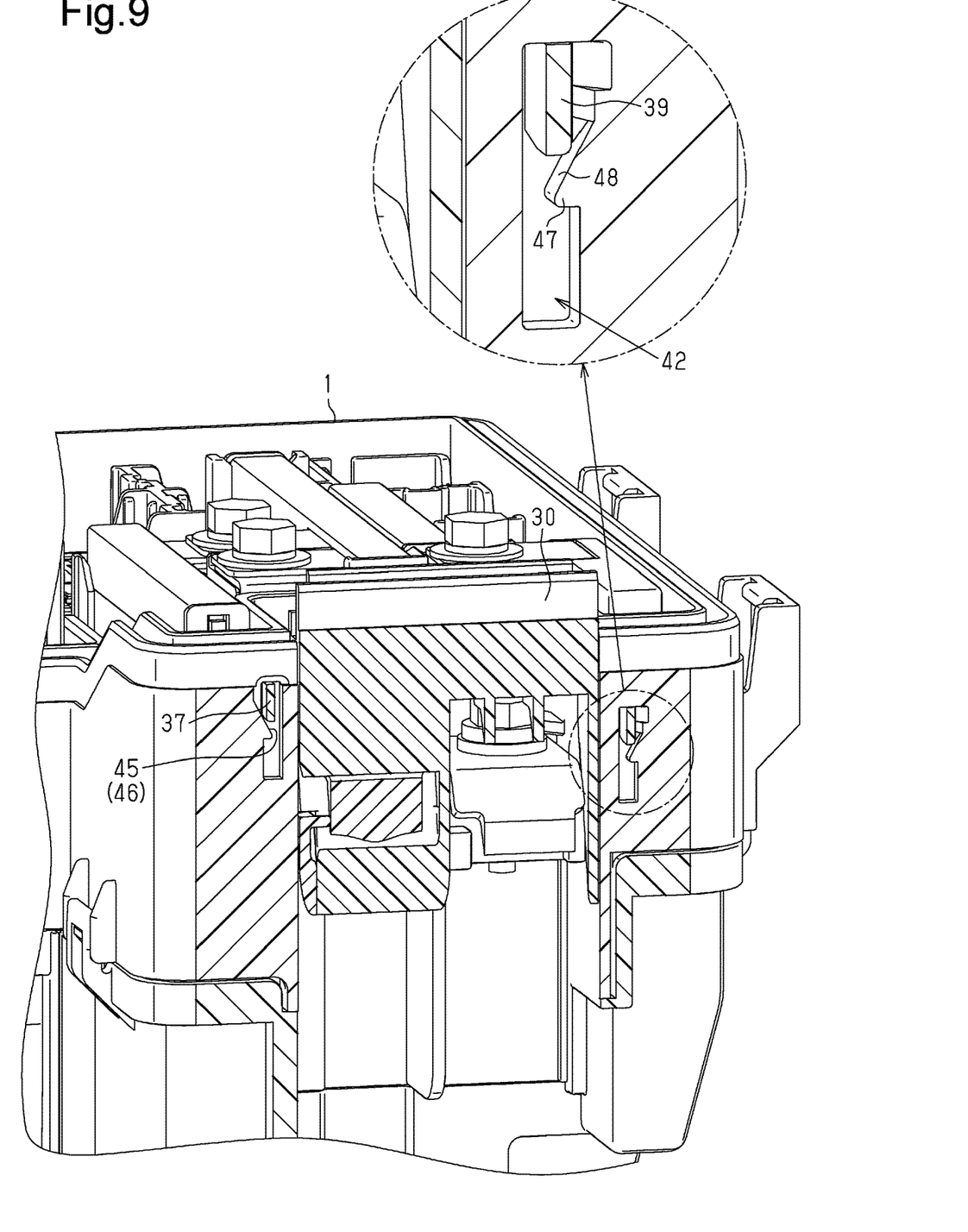
FIG. 9 is an enlarged, front, cross-sectional, and perspective view showing part of the power relay device of FIG. 8.
Figure 11:
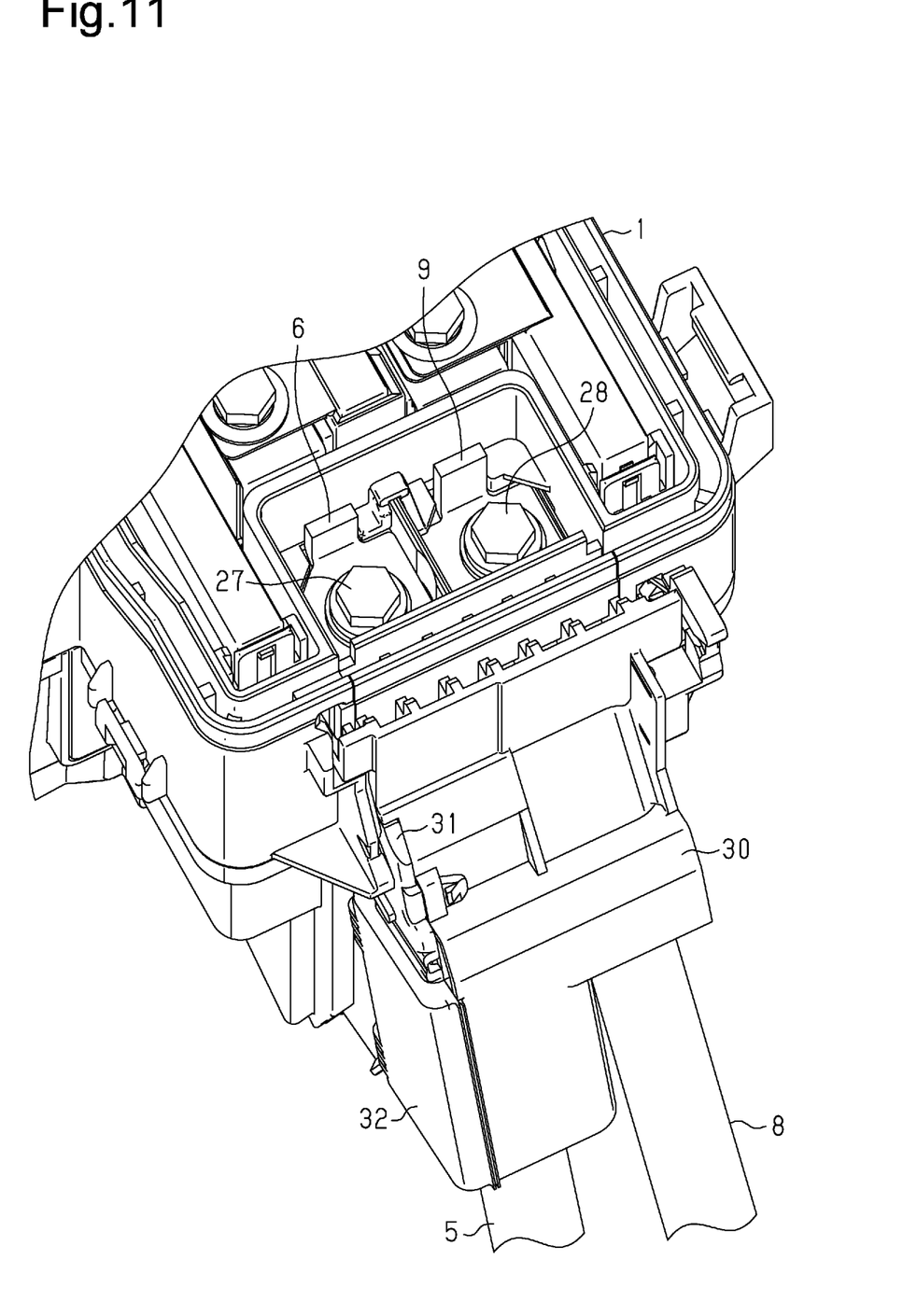
FIG. 11 is a partial perspective view of the power relay device in a state in which the terminal cover is fully held by the relay box.

As shown in FIG. 9, the engaged portion 42 includes an inner wall 47 projected inward by a length that linearly increases from the upper side toward the lower side. The projection length of the engaged portion 42 is determined by an inclined surface 48. In the same manner, the engaged portion 41 includes an inner wall 45 projected inward by a length that linearly increases from the upper side toward the lower side. The projection length of the engaged portion 41 is determined by an inclined surface 46. The arm 39 of the engaging portion 36 is held at a position on the inclined surface 48 of the engaged portion 42, and the arm 37 of the engaging portion 35 is held at a position on the inclined surface 46 of the engaged portion 41. This temporarily holds the terminal cover 30 on the relay box 1. The inclined surface 46 (inclined surface 48) serves as an example of a movement restriction portion that restricts movement of the arm 37 (arm 39) from a temporary holding position shown in FIGS. 8 and 9 to a final holding position shown in FIGS. 11 and 12.

Figure 10:
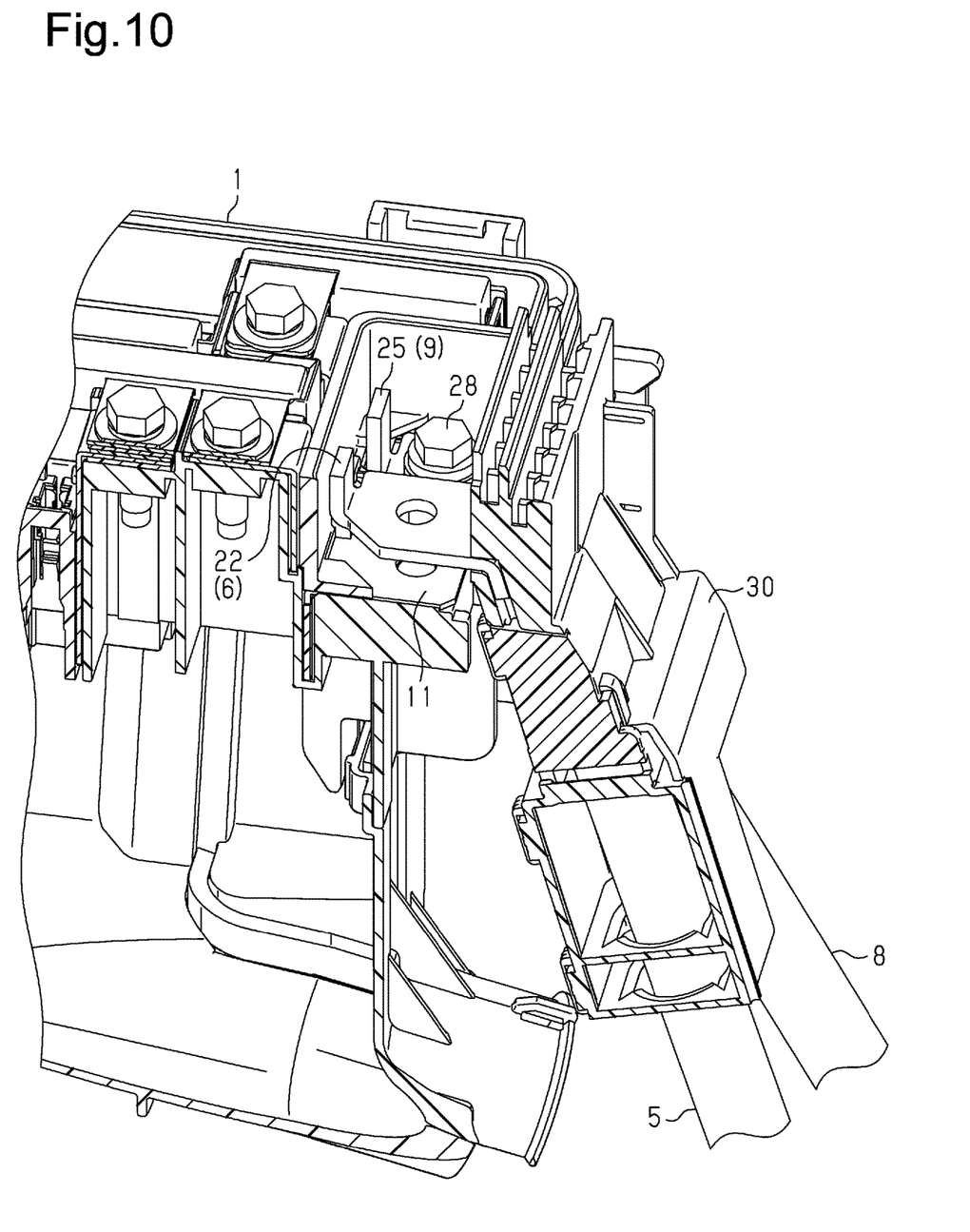
FIG. 10 is a side, cross-sectional, and perspective view showing the power relay device of FIG. 8.

As shown in FIG. 10, in a state in which the terminal cover 30 is temporarily held by the relay box 1, the connection terminal 6 of the battery cable 5 is electrically disconnected from the power source terminal 11 of the relay box 1. In this case, an upper end surface of the clip coupling portion 22 of the connection terminal 6 is located at the same height as an upper end surface of the clip coupling portion 25 of the connection terminal 9, which has been bolted to the terminal base of the relay box 1. In this temporary holding state, a metal clip 50 (refer to FIG. 1) is coupled to connect the clip coupling portion 22 of the connection terminal 6 and the clip coupling portion 25 of the connection terminal 9 so that the power seats 3 can be tested with the power supplied from the battery 2 to the power seats 3. The metal clip 50 serves as an example of an external connection medium, and the clip coupling portions 22 and 25 serve as examples of extension portions.

Figure 12:
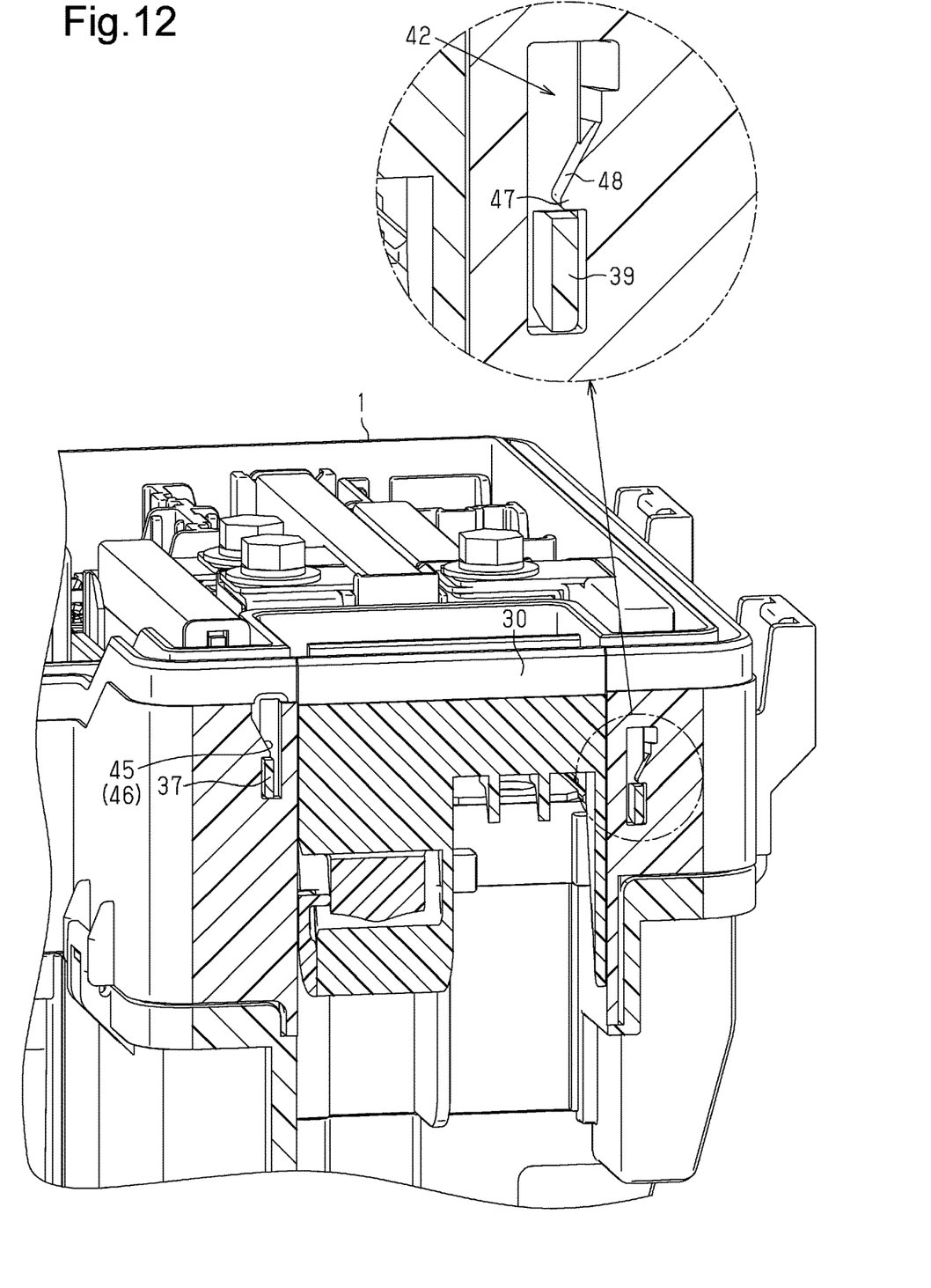
FIG. 12 is an enlarged, front, cross-sectional, partial, and perspective view showing the power relay device of FIG. 11.

With reference to FIGS. 9 and 12, the inclined surface 46 of the engaged portion 41 (inclined surface 48 of engaged portion 42) restricts movement of the arm 37 of the engaging portion 35 (arm 39 of engaging portion 36) from the temporary holding position toward the final holding position without being elastically deformed, and guides movement of the arm 37 (arm 39) from the temporary holding position toward the final holding position while being elastically deformed. The inclined surface 46 (inclined surface 48) serves as an example of a guide that guides movement of the arm 37 (arm 39) from the temporary holding position to the final holding position. The arm 37 (arm 39) has enough resiliency to move from the temporary holding position toward the final holding position while being elastically deformed when guided by the inclined surface 46 (inclined surface 48). The terminal cover 30 is held in a final position by the relay box 1 when the arm 37 moves beyond he inner wall 45 and recovers from the elastic deformation and the arm 39 moves beyond the inner wall 47 and recovers from the elastic deformation.

Figure 13:
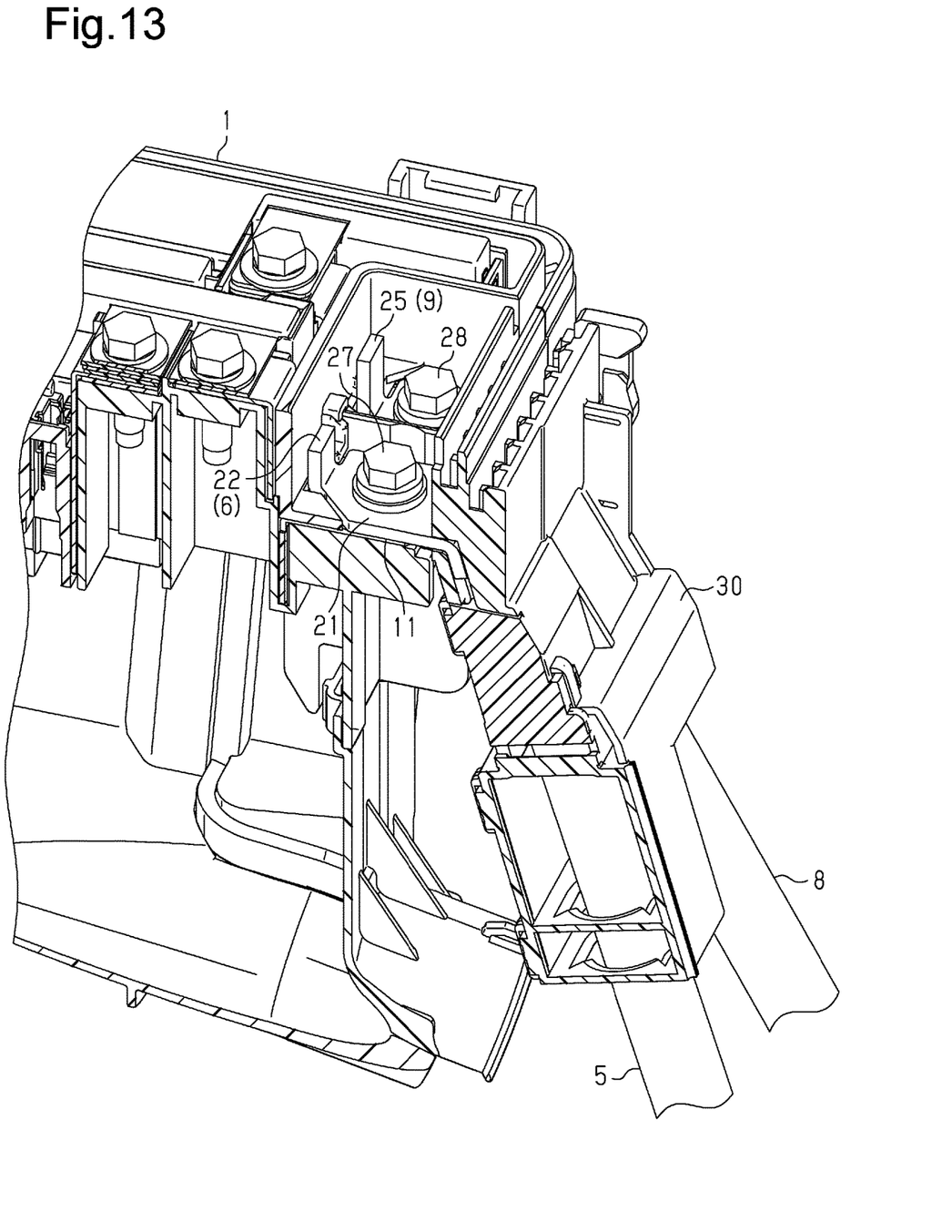
FIG. 13 is a side, cross-sectional, and perspective view showing the power relay device of FIG. 11.

More specifically, after testing of the power seats 3 is completed, the metal clip 50 is removed from the clip coupling portions 22 and 25, and the terminal cover 30 is lowered relative to the relay box 1 against the elastic force of the arms 37 and 39. Accordingly, the main terminal portion 21 of the connection terminal 6 comes into planar contact with the power source terminal 11 thereby electrically connecting the connection terminal 6 to the power source terminal 11. Then, the bolt 27 is inserted through the through hole 23 of the connection terminal 6 and fastened so that the terminal cover 30 is held in a final position by the relay box 1 (refer to FIG. 13).

In the present embodiment, the relay box 1 and the terminal cover 30 form an example of the power relay device. The relay box 1 serves an example of a main device body. The engaging portions 35 and 36 arranged on the terminal cover 30 and the engaged portions 41 and 42 arranged on the relay box 1 cooperate to form an example of a holding unit that selectively sets the temporary holding state in which the connection terminal 6 is electrically disconnected from the power source terminal 11 or the final holding state in which the connection terminal 6 is electrically connected to the power source terminal 11.

The operation of the power relay device will now be described.

With reference to FIG. 3, the cable 8 including the connection terminal 9 is coupled to the relay box 1 in isolation, and the battery cable 5 including the connection terminal 6 is coupled to the relay box 1 in a state coupled to and integrated with the terminal cover 30. In this case, the terminal cover 30 is coupled to the relay box 1 in a substantially horizontal direction so that the terminal cover 30 is temporarily held by the relay box 1 (refer to FIGS. 8 to 10). In the temporary holding state, the metal clip 50 temporarily connects the clip coupling portion 22 of the connection terminal 6 and the clip coupling portion 25 of the connection terminal 9 (refer to FIG. 1) to test the power seats 3.

After testing of the power seats 3 is completed, the metal clip 50 is removed from the clip coupling portions 22 and 25. Further, the terminal cover 30 in the temporary holding state is lowered relative to the relay box 1. The terminal cover 30 is lowered through a single touch operation until the main terminal portion 21 of the connection terminal 6 comes into planar contact with the power source terminal 11. Then, the bolt 27 is inserted through the through hole 23 of the connection terminal 6 and fastened. This holds the terminal cover 30 in a final position on the relay box 1 (refer to FIGS. 11 to 13).

The present embodiment has the advantages described below.

(1) Even in the temporary holding state in which the connection terminal 6 of the battery cable 5, which is coupled to the terminal cover 30, is electrically disconnected from the power source terminal 11 of the relay box 1, power can be temporarily supplied from the battery 2 to the power seats 3 by electrically connecting the connection terminal 6 to the load terminal 12 of the relay box 1. Thus, power is not constantly supplied from the battery 2 to the power seats 3, and the battery charge level does not decrease.

(2) Even in a temporary holding state in which the connection terminal 9 of the cable 8 is electrically connected to the load terminal 12 and the connection terminal 6 of the battery cable 5 is electrically disconnected from the power source terminal 11, the metal clip 50 is coupled to connect the clip coupling portion 22 of the connection terminal 6 and the clip coupling portion 25 of the connection terminal 9 so that power can be supplied from the battery 2 to the power seats 3. Thus, the power seats 3 can be easily tested.

(3) The hooks 38 and 40 and the stoppers 43 and 44 cooperate to form two locks that restrict separation of the terminal cover 30 from the relay box 1 in the coupling direction of the terminal cover 30. This improves the workability.

(4) The arm 37 (arm 39) of the terminal cover 30 is held in the temporary holding state by the restriction imposed by the inclined surface 46 (inclined surface 48) of the relay box 1. This allows for stable connection when testing the power seats 3.

(5) The inclined surface 46 (inclined surface 48) guides movement of the arm 37 (arm 39) from the temporary holding position toward the final holding position while being elastically deformed so that the terminal cover 30 is easily shifted from the temporary holding state to the final holding state after completing testing of the power seats 3.

(6) The terminal cover 30 can be shifted from the temporary holding state to the final holding state through a single touch operation. This improves the workability.

(7) The stroke length of the terminal cover 30 in the vertical direction when shifting from the temporary holding state to the final holding state can be minimized. This allows the battery cable 5 to be shortened.

(8) After installing the relay box 1, to which the terminal cover 30 is coupled in the temporary holding state, in the engine compartment and testing the power seats 3, the terminal cover 30 is lowered through a single touch operation to the final holding state. The operation is not performed in a substantially horizontal direction. Thus, even if a large working space cannot be provided around the relay box 1, the operation can be performed relatively easily.

The above embodiment may be modified as follows. The above embodiment and the following modifications can be combined as long as the combined modifications remain technically consistent with each other.

Instead of the battery cable 5 including the connection terminal 6, the cable 8 including the connection terminal 9 may be coupled to the relay box 1 in a state coupled to and integrated with the terminal cover 30. In this case, the battery cable 5 including the connection terminal 6 is coupled the relay box 1 in isolation. Further, in this case, the connection terminal 9 serves as an example of the first connection terminal and the connection terminal 6 serves as an example of the second connection terminal. Moreover, in this case, the length of the clip coupling portion 25 projecting from the main terminal portion 24 of the connection terminal 9 may be smaller than the length of the clip coupling portion 22 projecting from the main terminal portion 21 of the connection terminal 6. The difference between the projection lengths of the clip coupling portions 22 and 25 may coincide with the length of stroke of the connection terminal 9 in the vertical direction when the connection terminal 9 is coupled to the relay box 1.

With this structure, even if the battery 2 is constantly connected to the relay box 1 with the battery cable 5, in the temporary holding state in which the connection terminal 9 is electrically disconnected from the load terminal 12, power is not supplied from the battery 2 to the power seats 3 unless the metal clip 50 connects the clip coupling portion 22 of the connection terminal 6 and the clip coupling portion 25 of the connection terminal 9. This structure obtains the same advantages as the above embodiment.

The two the engaging portions 35 and 36 may be arranged on the relay box 1, and the engaged portions 41 and 42 may be arranged on the terminal cover 30 for engagement with the engaging portions 35 and 36. This structure obtains the same advantages as the above embodiment.

In the above embodiment, the inclined surfaces 46 and 48 function as both the movement restriction portion and the guide. Instead, a movement restriction portion and a guide may be separately arranged on the engaged portions 41 and 42.

The tested subject is not limited to the power seats 3.

The power relay device does not have to be installed in a vehicle.

Various changes in form and details may be made to the examples above without departing from the spirit and scope of the claims and their equivalents. The examples are for the sake of description only, and not for purposes of limitation.

Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power relay device that relays power from a power source and supplies the power to an electric component, the power relay device comprising:
   a main device body including a power source terminal electrically connected to the power source and a load terminal electrically connected to the electric component;
   a terminal cover including a connection terminal electrically connectable to a connected subject that is one of the power source terminal and the load terminal; and
   a holding unit that selectively sets a temporary holding state in which the connection terminal is electrically disconnected from the connected subject or a final holding state in which the connection terminal is electrically connected to the connected subject, wherein
   the connection terminal is a first connection terminal and the connected subject is a first connected subject,
   the power relay device further comprises a second connection terminal electrically connected to a second connected subject that is the other one of the power source terminal and the load terminal and differs from the first connected subject,
   the first connection terminal includes a main terminal portion configured to come into planar contact with the first connected subject and an extension portion bent and extended from the main terminal portion, and
   the second connection terminal includes a main terminal portion configured to come into planar contact with the second connected subject and an extension portion bent and extended from the main terminal portion.

2. A power relay device that relays power from a power source and supplies the power to an electric component, the power relay device comprising:
   a main device body including a power source terminal electrically connected to the power source and a load terminal electrically connected to the electric component;
   a terminal cover including a connection terminal electrically connectable to a connected subject that is one of the power source terminal and the load terminal; and
   a holding unit that selectively sets a temporary holding state in which the connection terminal is electrically disconnected from the connected subject or a final holding state in which the connection terminal is electrically connected to the connected subject, wherein
   the holding unit includes an engaging portion arranged on one of the main device body and the terminal cover and an engaged portion arranged on the other one of the main device body and the terminal cover, and
   the engaging portion and the engaged portion cooperate to form a lock that functions to restrict separation of the terminal cover from the main device body in a coupling direction of the terminal cover.

3. The power relay device according to claim 2, wherein
   the engaging portion includes an arm extending toward the engaged portion and a hook arranged on a distal end of the arm, wherein the hook engages the engaged portion to function as the lock, and
   the engaged portion includes a movement restriction portion that restricts movement of the arm of the engaging portion from a temporary holding position toward a final holding position, wherein in the temporary holding position, the terminal cover is in the temporary holding state in which the connection terminal is electrically disconnected from the connected subject, and in the final holding position, the terminal cover is in the final holding state in which the connection terminal is electrically connected to the connected subject.

4. The power relay device according to claim 3, wherein
   the engaged portion includes a guide that guides movement of the arm of the engaging portion from the temporary holding position toward the final holding position, and
   the arm has enough resiliency to move from the temporary holding position toward the final holding position while being elastically deformed when guided by the guide.

* * * * *